Patented Nov. 18, 1952

UNITED STATES PATENT OFFICE 2,618,651

PREPARATION OF DIMETHYL AND DIETHYL PHTHALATE FROM PHTHALIC ANHYDRIDE

Ronald Page and William Hunter, Spondon, near Derby, England, assignors to Celanese Corporation of America, a corporation of Delaware No Drawing. Application January 27, 1949, Serial No. 73,227. In Great Britain February 16, 1948

2 Claims. (Cl. 260—475)

This invention relates to improvements in the manufacture of organic compounds, and is concerned more particularly with the manufacture of esters of aromatic dicarboxylic acids and especially dimethyl phthalate.

Dimethyl phthalate can be prepared by heating phthalic anhydride and methanol under reflux, together with a catalyst such as sulphuric acid or sodium bisulphate, for a period of time sufficient to bring the reactants to equilibrium. In this process it is usually found necessary to employ the methanol in very large excess over that theoretically required, and even then little more than 80% of the phthalic anhydride is converted to dimethyl phthalate. The process can be improved considerably if the dimethyl phthalate is produced by a process in which the monomethyl phthalate formed as the first stage of the reaction between methanol and phthalic anhydride is heated with methanol, and the water produced is distilled off together with unchanged methanol, additional methanol being introduced into the reactants while the heating is continued until the methanol carries over substantially no more water. This process, which is described in U. S. Patent application S. No. 19,422 filed April 6, 1948, enables a high conversion of phthalic anhydride to dimethyl phthalate to be obtained without an exceedingly long reaction time. Even this improved process suffers, however, from the disadvantage that it entails the use of a substantial quantity of methanol with the consequent danger of losses either by way of distillation losses in the recovery and working up of unused methanol, or by the formation of by-products such as dimethyl ether.

The present invention has for its main object the improvement of the economics of the production of dimethyl phthalate from methanol and phthalic anhydride, this improvement being centered around a reduction in the quantity of methanol to be processed for the production of a given weight of dimethyl phthalate. In fact, it has been found by means of the invention that it is possible to reduce the quantity of methanol to be used in the process very substantially, while still obtaining a high conversion of phthalic anhydride to dimethyl phthalate and while, moreover, obtaining an improvement in the yield of dimethyl phthalate both with regard to the phthalic anhydride and with regard to the methanol processed.

In its broadest aspect the process of the invention comprises subjecting methanol and phthalic anhydride to reaction in the presence of a suitable catalyst so as to obtain dimethyl phthalate, the methanol employed being limited so as to avoid substantial reduction in conversion based on the methanol below the peak conversion which can in practice be realized, and thereafter dimethyl phthalate and methyl hydrogen phthalate are separately recovered from the reaction products, and the latter is subjected to further esterification in admixture with additional phthalic anhydride. In practice the quantity of methanol used is at the most twice that theoretically required completely to convert phthalic anhydride used into the dimethyl phthalate, i. e., 4 molecular proportions of methanol for each molecular proportion of phthalic anhydride. Generally it is preferred to use less methanol than this, for example less than a 50% excess over that theoretically required, although invariably an excess of methanol over that theoretically required should be used, and excellent results are obtained when only about 20–30% of methanol in excess of that theoretically required is employed.

As above indicated, the reaction is carried out in presence of a catalyst. In practice sulphuric acid has been found very satisfactory and may be used in quantity equal to, for example, 1–3% of the weight of the phthalic anhydride. As is known, however, other acid substances catalyse the reaction and, for instance, sodium bisulphate can be used.

It has been found advantageous to carry out the process in stages, the phthalic anhydride first being reacted with a quantity of methanol substantially equal to that theoretically required for complete esterification to dimethyl phthalate for a period of time sufficient for equilibrium conditions to obtain or be closely approached, the unchanged methanol then being distilled off and the heating continued with the addition of further methanol. The first stage is best carried out at a temperature in the neighborhood of 100° C. or somewhat below this, for example temperatures of 90°–100° C., and usually occupies a period of time of up to 3 hours. Thereafter the temperature can be raised 10–30° C., for example to a temperature of up to 120° C., unchanged methanol distilling off together with at least some of the water produced in the process. Additional methanol may then be introduced while continuing the heating at the same temperature, the methanol being introduced slowly and so as to cause distillation, together with some of the methanol, of the water produced in the reaction. Operating in this manner it has been found possible to effect a high conversion of the phthalic anhydride to dimethyl phthalate, e. g. in the neighborhood of 80%, and at the same time to achieve a high conversion of the methanol used.

The actual quantity of methanol used will be reduced somewhat after the first batch by the presence of recycled methyl hydrogen phthalate. Thus the process may comprise heating a mixture containing, for each 100 molecular proportions of phthalic anhydride, 30–35 molecular proportions of methyl hydrogen phthalate, 220–250 molecular proportions of methanol and a small quantity of catalyst (e. g. 1–3% by weight of concentrated sulphuric acid based on the weight of available phthalic anhydride), followed by continued heating at a higher temperature to drive off water and unchanged methanol, and continued heating during the addition of a further 65–80 molecular proportions of methanol.

When the desired quantity of methanol has been added and no further distillation takes place at the reaction temperature, the reaction product is cooled and washed with aqueous alkali. Aqueous caustic soda is relatively cheap to use and is quite effective in a concentration of 10–30% by weight. Usually satisfactory separation of unchanged methyl hydrogen phthalate from the dimethyl phthalate is obtained if the quantity of aqueous caustic soda of 25% concentration used is equal to 0.5–0.6 part by weight for each part by weight of phthalic anhydride initially employed. After the washing operation, it is preferred to wash the dimethyl phthalate obtained with water, rather less water being needed than the quantity of aqueous alkali used, for example 0.2–0.3 part by weight for each 0.5–0.6 part by weight of 25% caustic soda solution. It is convenient to mix the washings with the aqueous alkali washings and thereafter to acidify the mixture, e. g. with aqueous sulphuric acid which may be of 10–30% concentration and should be used in quantity equivalent to the alkali used for the washing, and may even be a little in excess so that an acidic product is obtained. Under these conditions methyl hydrogen phthalate, together with a little dimethyl phthalate, separates and after washing with water and drying, for example by air blowing at a temperature somewhat above 100° C., can be added to a fresh charge of phthalic anhydride to be subjected to esterification. The dimethyl phthalate can likewise be water washed and dried by air blowing, and thus a product is obtained which usually, on analysis, is found to consist of dimethyl phthalate of over 99% purity. Methanol may be recovered by distillation from the salt solution remaining after release of the methyl hydrogen phthalate, and likewise from the aqueous washings.

The process of the invention has been described more particularly in connection with the production of dimethyl phthalate, but it may be applied similarly to the production of di-esters of other aromatic dicarboxylic acids, especially hydrogenated phthalic acids such as the di- and tetrahydro phthalic acids. Moreover, esters of alcohols other than methanol may be made by the process, for example esters of ethanol, the propanols, secondary and normal butanols, as well as glycol ethers, e. g. ethylene glycol monomethyl ether and other distillable aliphatic monohydroxy compounds. In making these di-esters the conditions can, in general be about the same as those given for making dimethyl phthalate although the particular conditions needed to obtain the best results may be found to differ slightly in each case. Thus, when producing diethyl phthalate it is preferred to use a slightly higher excess of ethanol than the 20–30% found best when making dimethyl phthalate, the best results usually being obtained using about 1 molecular proportion of excess ethanol, i. e. the initial reaction mixture consists of about 2 molecular proportions of ethanol to each molecular proportion of available phthalic anhydride and during the subsequent heating with additional ethanol about another molecular proportion is used. In batch operation with recycling of the ethyl hydrogen phthalate the charge may contain, for example, for each 100 molecular proportions of phthalic anhydride 25–30 molecular proportions of ethyl hydrogen phthalate and 200–250 molecular proportions of aqueous alcohol of 90–95% concentration; for the subsequent additional alcohol with such a charge 110–130 molecular proportions of 90–95% ethanol may be used. Again, when producing di-(methoxy-ethyl) phthalate from ethylene glycol monomethyl ether and phthalic anhydride, it is desirable to employ reduced pressure during that part of the process which is occupied in distilling the excess ethylene glycol monomethyl ether together with water formed in the process.

In carrying out the process of the invention, it is desirable to employ the alcohol in anhydrous form but this is not essential. Methanol can quite conveniently be employed substantially free from water, but ethanol is available industrially in a concentration of 90–95% so much more readily than in the anhydrous form that it is more convenient to use alcohol of this concentration. Where such aqueous alcohols are used the attainment of equilibrium conditions is liable to take somewhat longer. It has been found that when using aqueous ethanol of 90–95% concentration, the initial stage of the process usually occupies 6 hours as opposed to the initial stage where the reactant is anhydrous methanol where, as above indicated, equilibrium is usually reached in a period of up to 3 hours. Despite this fact it will be appreciated that in any case a substantial saving of time is achieved by the process of the invention. In fact, a total reaction time of some 5½ hours is adequate in the production of dimethyl phthalate, whereas a very much longer time is needed if the process consists simply in heating under reflux the reactants and using a very large excess of methanol in order to achieve the same conversion of phthalic anhydride. Moreover, by the process of the invention very high yield figures are obtained, in the case of the production of dimethyl phthalate the yield both on the phthalic anhydride and on the methanol charge being more than 95%. These results are obtained together with a substantial reduction in the quantity of methanol which has to be processed, thus providing a substantial saving in heat. As these results are obtained for the expenditure of a very small quantity of alkali and acid, it will be appreciated that the process of the invention is of great technical importance.

The following examples illustrate the invention:

Example 1

Phthalic anhydride is refluxed with anhydrous methanol, in the molecular proportions of 1:2, together with 2% of 95% sulphuric acid based on the weight of the phthalic anhydride used. Refluxing is continued for three hours at 93–95° C. after which the temperature of the mixture is raised to 130° C. and held at this temperature until the unchanged methanol has distilled off, taking with it some of the water produced in the reaction. With the temperature still at 130° C. a slow feed of liquid methanol is introduced below the surface of the mixture, the operation being continued for 1½ hours during which time a quantity of methanol equivalent to ½ mole per mole of phthalic anhydride used is introduced, and the distillate is added to that previously obtained. In this way nearly 90% of the phthalic anhydride is esterified in little more than 4½ hours to give a product in which more than 75% of the ester content is dimethyl phthalate.

After cooling the crude product is mixed with caustic soda solution of about 20% concentration in quantity equal to approximately half the weight of the phthalic anhydride used initially. On standing the mixture separates into an oily ester layer and an aqueous layer. The ester layer is separated and washed with a quantity of water equal to about one quarter the weight of the phthalic anhydride used initially and the aqueous extract thus obtained added to the aqueous layer. The washed ester layer, after drying by air blowing at 110° C., is found on analysis to be dimethyl phthalate of over 99% purity. The combined aqueous product is neutralized with sulphuric acid and the methanol present distilled off, after which additional sulphuric acid is added to make the total used equivalent to the caustic soda used, whereupon an oily layer consisting of wet monomethyl phthalate containing a little dimethyl phthalate forms and is separated and dried by air blowing at 110° C. The dry product, which tends to crystallise on standing, is recycled as described in Example 2 below. All the aqueous liquors are distilled for the recovery of methanol.

As a result of the operation 75–80% of the phthalic anhydride used is converted into dimethyl phthalate of which more than 99% pure product represents about 90%.

*Example 2*

The charge used consists of the monomethyl phthalate containing a little dimethyl phthalate obtained in Example 1, additional phthalic anhydride, methanol and sulphuric acid, the molecular ratio of total available phthalic anhydride to methanol being 1:2, the free phthalic anhydride 73% of the total and the sulphuric acid about 2% by weight on the total phthalic anhydride. The operation is conducted exactly as in Example 1.

The conversion to dimethyl phthalate of over 99% purity based on the free phthalic anhydride used can in this way be kept at a very high value (more than 99%), the monomethyl phthalate product being obtained in suitable quantity for use in making up the next charge.

Overall yield of dimethyl phthalate in the process is thus more than 99%, while recovery of the methanol by distillation of aqueous liquids makes possible yields based on methanol consumed of about 97%.

*Example 3*

The initial charge used consists of phthalic anhydride and ethyl alcohol in the molecular proportion of 1:2, together with 2% by weight of 95% sulphuric acid, aqueous ethyl alcohol of 92% concentration being used. In later charges phthalic anhydride, recycled mono-ethyl phthalate and ethyl alcohol are used in the molecular ratio 0.8:0.2:1.8.

The mixture is refluxed for 6 hours at 95° C. and then the temperature is raised to 120° C. and water and unchanged ethyl alcohol distilled off. Then, while maintaining the temperature at 120° C., a slow feed of liquid ethyl alcohol is introduced below the surface of the mixture, this operation being continued for 3 hours, the total alcohol introduced being equivalent to about one molecular proportion per two molecular proportions originally used, aqueous alcohol distilling over.

The working up of the product is carried out as in Example 1, the quantity of caustic soda needed being equal to about 5% of the weight of diethyl phthalate made.

In this way, operating with recycling of the monoethyl phthalate, diethyl phthalate of high purity can be obtained with yields of the same high order as is the case with dimethyl phthalate.

Having described our invention, what we desire to secure by Letters Patent is:

1. Method of effecting the substantially complete conversion of the anhydride of an acid selected from the group consisting of phthalic and hydrogenated phthalic acids into a dialkyl ester of the acid, the alkyl group containing up to two carbon atoms, which comprises heating an initial mixture of the anhydride, the corresponding mono-alkyl ester and the alkanol with an esterification catalyst to a temperature of 90 to 100° C., the mono-ester representing 25 to 35 mole percent of the anhydride and the quantity of the alkanol being at the most sufficient to convert all the anhydride and mono-ester into diester, continuing the heating until equilibrium is substantially attained, raising the temperature 10 to 30° and distilling off water and unchanged alkanol, slowly introducing into the reaction mixture maintained at the higher temperature a further quantity of alkanol equal at the most to 50% of the quantity in the initial mixture, while distilling off water together with some of the alkanol to leave a product comprising the diester and the mono-ester in quantities substantially equivalent respectively to the anhydride and the mono-ester present in the initial mixture.

2. Method of effecting the substantially complete conversion of phthalic anhydride into dimethyl phthalate, which comprises heating an initial mixture of phthalic anhydride, monomethyl phthalate and methanol with sulphuric acid as catalyst to a temperature of 90 to 100° C., the monomethyl phthalate representing 25 to 35 mole percent of the phthalic anhydride and the quantity of methanol being at the most sufficient to convert all the phthalic anhydride and monomethyl phthalate into dimethyl phthalate, continuing the heating until equilibrium is substantially attained, raising the temperature 10 to 30° and distilling off water and unchanged methanol, slowly introducing into the reaction mixture maintained at the higher temperature a further quantity of methanol equal at the most to 50% of the quantity in the initial mixture, while distilling off water together with some of the methanol to leave a product comprising dimethyl phthalate and monomethyl phthalate in quantities substantially equivalent respectively to the phthalic anhydride and the monomethyl phthalate present in the initial mixture.

RONALD PAGE.
WILLIAM HUNTER.

REFERENCES CITED

The following references are of record in the file of this patent:

UNITED STATES PATENTS

| Number | Name | Date |
|---|---|---|
| 1,554,032 | Reid | Sept. 15, 1925 |
| 2,020,356 | Hawley | Nov. 12, 1935 |